Patented May 9, 1950

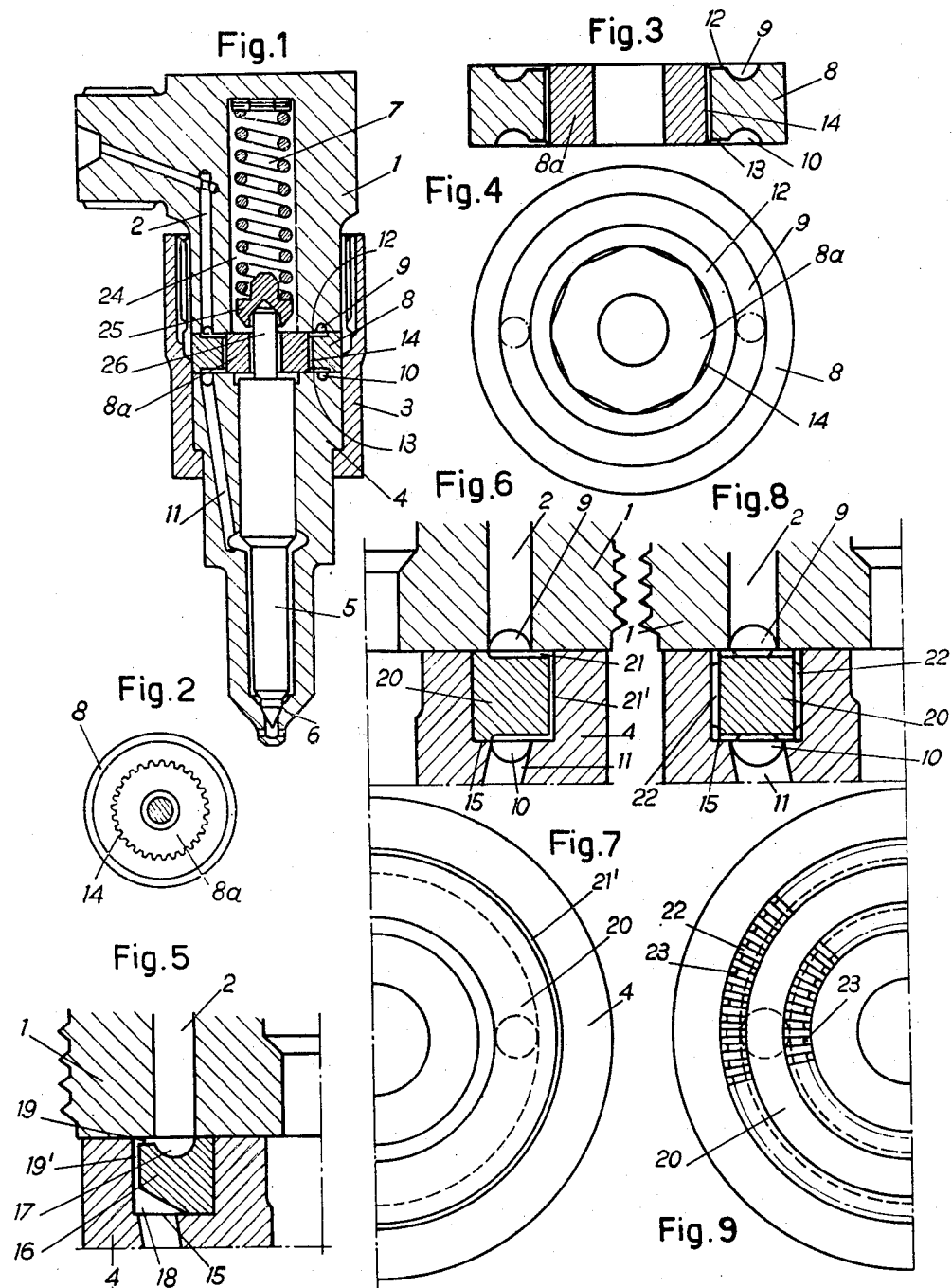

2,507,355

UNITED STATES PATENT OFFICE 2,507,355

FILTER FOR INJECTORS FOR COMBUSTION ENGINES

Giuseppe Sola, Turin, Italy

Application January 14, 1947, Serial No. 721,975
In Italy January 17, 1946

6 Claims. (Cl. 210—164)

The present invention relates to fuel injectors for use in internal combustion engines and refers to the filters which are usually arranged in the body of the injector to prevent fuel impurities from reaching the nozzle and obstructing the holes thereof to the prejudice of a satisfactory operation of the injector.

The present invention has for its object to provide a filter of the above mentioned type wherein the necessary extent of the filtering surface may be obtained with a reduced length of the filter member without increasing the diameter of the cross section of said member; at the same time it allows the use of the same filtering member both to shut the spring hole and to stop the displacement of the needle by utilizing one of its faces.

According to the invention the filtering passage or interval is provided by a member located between facing walls of said injector-carrier and injector member and is comprised between two grooves located at opposite sides of such member, one of said grooves communicating with the fuel inlet duct and the other with the duct leading to the nozzle.

These two grooves can be obtained in various manners, more particularly they can either be engraved on the opposite faces of a disc or ring which is arranged between the injector carrier and the body of the injector and provides the filtering passage or be engraved on the opposite faces of the injector carrier and of the body of the injector, or they may be created by lodging a filtering member in an annular seat in the body of the injector.

Some embodiments of the present invention are shown in the accompanying drawing, in which Fig. 1 is an axial section of an injector provided with the filter according to the invention, Fig. 2 is a cross section of the internal body of the injector showing the disc which constitutes the filtering members, Fig. 3 is an axial section in enlarged scale of another embodiment of the same disc, of which Fig. 4 is a frontal view, Fig. 5 is an axial section of half the portion of the injector where the ring which constitutes the filtering member is arranged, Fig. 6 is an axial partial section of a portion of an injector provided with a filter of different shape, and Fig. 7 is the corresponding plan view of the injector, Figs. 8 and 9 are views similar to Figs. 6 and 7 of another modification.

Referring now to Fig. 1, 1 indicates the injector-carrier in which a fuel inlet duct 2 is bored and to which the body 4 of the injector is connected by means of a screwed sleeve 3. In the body 4 of the injector, the needle 5 is lodged in the usual manner, the end of said needle being pressed against the outlet hole 6 by means of a spring 7 placed in a cavity 24 of the injector-carrier and acting on a plunger 25 bearing on the end pin 26 of the needle 5. The body 4 and the injector-carrier 1 form at their ends two plane faces facing each other, between which is located a disc 8, which constitutes the filtering member.

In the example shown in Fig. 1, the frontal faces facing each other of the injector-carrier 1 and of the injector body 4 have annular grooves 9 and 10 respectively engraved therein, the groove 9 communicating with inlet duct 2 and the groove 10 communicating with the duct 11 leading to the nozzle.

The disc 8 which is placed between the opposite faces of the injector carrier 1 and of the injector body 4 had a portion of slightly reduced thickness at the region facing the grooves 9 and 10 and enclosed between said grooves as shown in 12 and 13 thus creating thin channels which are in communication with each other by means of several passages 14 of small section crossing the thickness of the disc 8.

The passages 14 of small section constitutes a filtering device to which the channels 12 and 13 are to be added when the distance between the bottom of said channels 12 and 13 and the opposite face is given a value small enough.

To realize these passages 14 of small section, it is preferred to have the disc formed by two coaxial parts 8 and 8a the lateral surfaces of which facing each other are rifled or otherwise machined, so that after the two parts have been joined by forcing the central part 8a into the external one 8 the two surfaces facing each other leave between them passages of small section which keep the two channels 12 and 13 and the grooves 9 and 10 in communication with each other.

Instead of being engraved in the facing walls of the injector carrier 1 and of the injector body 4, the two grooves 9 and 10 can be engraved in the opposite faces of the disc 8 which constitutes the filtering member.

Such an embodiment of this invention is shown in Figs. 3 and 4 in which the disc is still constituted by two concentric parts 8 and 8a inserted one within the other, so that they create through the disc a passage rim 14 of small section. Thus the intervals of small thickness between the grooves 9 and 10 and the passages 14 is still created by a region hollowed out of the frontal faces of the ring 8, so that the grooves 9 and 10 communicate with each other through the intervals 12 and 13 and the passages 14, the whole of these intervals and passages constituting the proper filter.

Fig. 4 shows how the passages 14 of small section which are left between the two concentric parts 8 and 8a constituting the filtering member can be obtained by flattened faces of the lateral surfaces of the part 8a instead of being constituted by rifles as shown in Fig. 2.

The disc 8 or 8, 8a may be variously shaped and it may create by its section and in combination with the section of its seat or surrounding space in the injector body 4 or in the injector carrier, the grooves 9 and 10 as well as the filtering passages 12, 13 and 14.

Fig. 5 shows an embodiment of this construction wherein the body 4 of the injector provides an annular room 15 of large section in which a ring 16 is located which has a groove 17 in its upper face and in the lower face a simple bevelling, which leaves in the room 15 a portion 18 forming the opposite groove jointly with the walls of said room 15.

Between the grooves 17 and 18 thus constituted, a filtering passage is created which is formed by an annular flat interval 19 between the frontal surface of the ring 16 outside the groove 17 and the facing surface of the injector-carrier and by the cylindrical interval 19' between the lateral external face of the ring 16 and the peripheric wall of the room 15.

In the example shown in Figs. 6 and 7, the grooves 9 and 10 communicating with the fuel inlet and delivery ducts respectively are engraved in the frontal face of the injector-carrier 1 and in the bottom wall of a room 15 of large section in the injector body 4.

In this room 15 there is located a ring 20 which is internally as high as said room and is therefore forced between the bottom of said room and the frontal wall of the injector-carrier 1. For the remainder, the surfaces of the ring 20, both opposite the two grooves 9 and 10 and on the external face are slightly hollowed out so that they provide a small interval 21 and a small interval 21' between themselves and the facing walls of the room, said intervals constituting the filtering communication between the two grooves 9 and 10.

In the example shown in Figs. 8 and 9 the ring 20 placed in the room 15 in the injector body 4 is helped in said room by means of side projections 22 which create several small channels 23 jointly with the facing walls of the room 15.

In the latter case, the two grooves 9 and 10 communicate on both the side surfaces of the ring 20 through the channels 23 which may be formed by rifling the facing walls of the ring 20 and of the room 15.

In the portion between the side surfaces where the channels 23 and the grooves 9 and 10 are engraved, the ring 20 may be slightly lower than the room 15, so that two intervals of small section are left, these intervals constituting filtering communications between the grooves 9 and 10 and the channels 23.

In all the above described cases it is also possible to have the interval or the intervals constituting the filtering passages gradually decreasing in width in the direction of the fuel flow, so that a progressive or gradual filtering action is obtained.

The frontal space required by the filter is limited by the described arrangement, wherein fuel inlet and delivery ducts are on the opposite sides of the filtering member, to such an extent that the filter can be applied to usual injectors having standard diameters.

Furthermore, in the described conditions the member creating the filtering passages may be utilized to limit the displacement of the injector needle and to close the hole for the spring in the injector-carrier.

What I claim is:

1. A fuel filter for injectors for internal combustion engines comprising an injector carrier and an injector body connected together and providing a space defined by at least a peripheral wall and two transverse faces, said carrier and body having fuel inlet and delivery ducts each opening in one of said transverse faces, a member located in said space and having frontal transverse faces opposite to transverse faces defining said space, each of said opposite transverse faces having an annular groove communicating with said fuel inlet duct and said fuel delivery duct respectively, said member fitting closely in said space on a portion of its opposite transverse faces and having another portion of said transverse faces fitting with a restricted clearance providing a filtering passage, said filtering passage extending transversely beyond said corresponding annular groove, and means connecting said annular grooves at the opposite sides of said member through said filtering passage.

2. A fuel filter for injectors for internal combustion engines comprising an injector carrier and an injector body, means connecting together said injector carrier and body with a space between them, said space being defined by said connecting means and by the opposite transverse faces of said carrier and body, said carrier and body having fuel inlet and delivery ducts each opening in one of said transverse faces, a member located in said space and having frontal transverse faces opposite to transverse faces defining said space, each of said opposite transverse faces having an annular groove communicating with said fuel inlet duct and said fuel delivery duct respectively, said member fitting closely in said space on a portion of its opposite transverse faces and having another portion of said transverse faces fitting with a restricted clearance providing a filtering passage, said filtering passage extending transversely beyond said corresponding annular groove, and means connecting said annular grooves at the opposite sides of said member through said filtering passage.

3. A fuel filter for injectors for internal combustion engines comprising an injector carrier and an injector body, means connecting together said injector carrier and body with a space between them, said space being defined by said connecting means and by the opposite transverse faces of said carrier and body, said carrier and body having fuel inlet and delivery ducts each opening in one of said transverse faces, and a member located in said space and having frontal transverse faces opposite to transverse faces defining said space, each of said opposite transverse faces having an annular groove communicating with said fuel inlet duct and said fuel delivery duct respectively, said member fitting closely in said space on a portion of its opposite transverse faces and having another portion of said transverse faces fitting with a restricted clearance providing a filtering passage, said filtering passage extending transversely beyond said corresponding annular groove, said member providing through itself passages connecting said annular grooves at the opposite sides of said member through said filtering passage.

4. A fuel filter for injectors for internal combustion engines comprising an injector carrier and an injector body connected together with their opposite faces in contact with each other, one of said carrier and body providing a space defined by two annular walls and two transverse faces, said carrier and body having fuel inlet and delivery ducts each opening in one of said transverse faces, an annular member located in said space and having frontal transverse faces opposite to transverse faces defining said space, each of said opposite transverse faces having an annular groove communicating with said fuel inlet duct and said fuel delivery duct respectively, said annular member fitting closely in said space on a portion of its opposite transverse faces and having another portion of said transverse faces fitting with a restricted clearance providing a filtering passage, said filtering passage extending transversely beyond said corresponding annular groove, and means connecting said annular grooves at the opposite sides of said member through said filtering passage.

5. A fuel filter for injectors for internal combustion engines comprising an injector carrier and an injector body connected together with their opposite faces in contact with each other, one of said carrier and body providing a space defined by two annular walls and two transverse faces, said carrier and body having fuel inlet and delivery ducts each opening in one of said transverse faces, an annular member located in said space and having frontal transverse faces opposite to transverse faces defining said space, each of said opposite transverse faces having an annular groove communicating with said fuel inlet duct and said fuel delivery duct respectively, said annular member fitting closely in said space on a portion of its opposite transverse faces and having another portion of said transverse faces fitting with a restricted clearance providing a filtering passage, said filtering passage extending transversely beyond said corresponding annular groove, said annular member providing with an annular wall of said space passages connecting said annular grooves at the opposite sides of said member through said filtering passage.

6. A fuel filter for injectors for internal combustion engines comprising an injector carrier and an injector body connected together with their opposite faces in contact with each other, one of said carrier and body providing a space defined by two annular walls and two transverse faces, said carrier and body having fuel inlet and delivery ducts each opening in one of said transverse faces, an annular member located in said space and having frontal transverse faces opposite to transverse faces defining said space, each of said opposite transverse faces having an annular groove communicating with said fuel inlet duct and said fuel delivery duct respectively, said annular member fitting closely in said space on a portion of its opposite transverse faces and having another portion of said transverse faces fitting with a restricted clearance providing a filtering passage, said filtering passage extending transversely beyond said corresponding annular groove said annular member providing with the annular walls of said space passages connecting said annular grooves at the opposite sides of said member through said filtering passage.

GIUSEPPE SOLA.

REFERENCES CITED

The following references are of record in the file of this patent:

UNITED STATES PATENTS

| Number | Name | Date |
| --- | --- | --- |
| 1,459,925 | Olin | June 26, 1923 |
| 1,802,423 | Hemmingsen | Apr. 28, 1931 |
| 1,835,047 | Hill | Dec. 8, 1931 |
| 1,964,218 | Schargorodsky | June 26, 1934 |
| 2,067,131 | Schlaupitz | Jan. 5, 1937 |

FOREIGN PATENTS

| Number | Country | Date |
| --- | --- | --- |
| 696,574 | France | of 1930 |
| 703,506 | France | of 1931 |